(12) United States Patent
Maezawa et al.

(10) Patent No.: US 6,668,862 B2
(45) Date of Patent: Dec. 30, 2003

(54) FLUID BEARING MECHANISM

(75) Inventors: Kazuo Maezawa, Yoshida-machi (JP); Takayuki Minagawa, Yoshida-machi (JP); Hideto Urasawa, Yoshida-machi (JP)

(73) Assignee: Twinbird Corporation (JP)

( * ) Notice: Subject to any disclaimer, the term of this patent is extended or adjusted under 35 U.S.C. 154(b) by 7 days.

(21) Appl. No.: 10/128,726

(22) Filed: Apr. 23, 2002

(65) Prior Publication Data

US 2002/0153048 A1 Oct. 24, 2002

(30) Foreign Application Priority Data

Apr. 23, 2001 (JP) .......................................... 2001-124901

(51) Int. Cl.[7] ............................................... F16K 15/14
(52) U.S. Cl. .................... 137/843; 137/532; 137/533.11
(58) Field of Search ................................ 137/843, 528, 137/532, 533, 533.11; 60/520

(56) References Cited

U.S. PATENT DOCUMENTS 4,583,364 A * 4/1986 Wood ........................... 60/520
4,775,301 A * 10/1988 Cartwright et al. ........ 137/859 R
5,461,859 A    10/1995 Beale et al.

* cited by examiner

Primary Examiner—Kevin Lee
(74) Attorney, Agent, or Firm—Akerman Senterfitt

(57) ABSTRACT

A fluid bearing mechanism using a one-way valve with such a simple structure that high processing accuracy is not required. A one-way valve 6 includes a valve base 7; an abutting portion 11 protruding inwardly, formed with a small communication hole 12 in a center thereof; a moveable element 8 which is moveable inside the valve base 7 in an axial direction; and a retaining body 9 for retaining the moveable element 8 between the abutting portion 11 and itself inside the valve base 7. The retaining body 9 includes ventilation grooves 8b, 9c for communicating an inside with an outside of the valve base 7. When the piston 2 is moved toward the compressing direction, the moveable element 8 is shifted toward the inside of the piston 2 due to the inner pressure of the cylinder 1 and its inertial force, thus opening the small communication hole 12.

9 Claims, 5 Drawing Sheets

FLUID BEARING MECHANISM

BACKGROUND OF THE INVENTION a) Field of the Invention

The present invention relates to a fluid bearing mechanism for antifriction between a piston and a cylinder of a reciprocating compressor or the like, particularly to a one-way valve for providing or interrupting the communication between the inside and the outside of a compression chamber for use with such compressor.

b) Prior Art

Conventional fluid bearing mechanisms are illustrated in FIGS. 6 to 8. The fluid bearing mechanism comprises: a cylinder 101, a reciprocating piston 102 inserted into the cylinder 101 with a slight clearance G provided therebetween; a hollow interior 102a formed inside the piston 102; a one-way valve 103 provided at a distal end of the piston 102, said one-way valve 103 providing the communication between a space 101a within the cylinder 101 and the hollow interior 102a; and small holes defined through a side surface 102b of the piston 102, said small holes 104 providing the communication between the clearance G and the hollow interior 102a. For the above-mentioned one-way valve 103, U.S. Pat. No. 5,461,859, for example, discloses a structure of one of conventional one-way valves for that purpose.

The conventional one-way valve 103 comprises a valve base 105, a reed 106, a reed retainer 107, and a fastening screw 108 as illustrated in FIG. 8. The valve base 105 is formed with a communication hole 109 which provides the communication between the space 101a within the cylinder and the hollow interior 102a when it is mounted to the piston 102, while the reed 106 and the reed retainer 107 are fixed by the fastening screw 108 in the vicinity of an opening 109a of the communication hole 109 located adjacent to the hollow interior 102a.

In a state where the piston 102 is stationary, the reed 106 is allowed to close the opening 109a by abutting against an abutting surface 105a around the opening 109a. During the advance trip of the piston 102 within the cylinder 101, pressure difference between the space 101a within the cylinder 101 and the hollow interior 102a urges a gas inside the space 101a to pass through the commutation hole 109 to bend the reed 106, flowing through the opening 109a into the hollow interior 102a, and then flowing out of the small holes 104 into the clearance G. At this moment, excessive bending of the reed 106 is prevented due to the aforesaid reed retainer 107. Thus, the gas flowing out into the clearance G provides the antifriction between the cylinder 101 and the piston 102. On the other hand, during the return trip of the piston 102 within the cylinder 101, the pressure difference between the space 101a within the cylinder and the hollow interior 102a as well as the restoring force by the reed 106 allow the opening 109a to be closed by the reed 106. In this way, the gas inside the space 101a within the cylinder flows in one direction only.

According to the conventional one-way valve 103 of the fluid bearing mechanism, however, it was imperative to process the respective surfaces of the reed 106 and the abutting surface 105a smoothly and accurately enough to prevent the gas from flowing backwardly from between the reed 106 and the abutting surface 105a. Further, as the reed 106 is made from a thin metal plate in order to bend it at a high speed, there has been a problem that it is likely to be deformed at the time of processing or mounting process.

SUMMARY OF THE INVENTION

To eliminate the above problems, it is a main object of the invention to provide a fluid bearing mechanism using a one-way valve, which is structured so simply that high processing accuracy is not required, and which is at the same time easy to assemble, with high reliability.

To attain the above objects, there is provided from a first aspect of the invention, a fluid bearing mechanism which comprises: a cylinder; a piston positioned inside the cylinder, having a side surface, end faces and a hollow interior formed therein side, said piston including small holes defined through the side surface for communicating the hollow interior with an exterior thereof; a one-way valve provided between the end face and the hollow interior of said piston, said one-way valve allowing a gas to flow in one direction only, wherein said one-way valve comprises: a cylindrical body provided in parallel with an axial direction of said piston; an abutting portion provided along an inner periphery of said cylindrical body, said abutting portion protruding inwardly, formed with a small communication hole in a substantial center thereof; a moveable element which is moveable inside said cylindrical body in an axial direction thereof; and a retaining body for retaining said moveable element between said abutting portion and itself inside said cylindrical body, said retaining body including a ventilation groove for communicating an inside with an outside of said cylindrical body According to the first aspect of the invention, when the piston is moved to the compressing direction inside the cylinder, the moveable element is urged toward the inside of the piston, due to the inner pressure of the cylinder and its inertia, so that the small communication hole is opened, thus allowing the gas inside the cylinder to flow from the small communication hole of the one-way valve, through the ventilation grooves into the hollow interior of the piston, and then to flow through the small holes into the clearance between the piston and the cylinder. As a result, the clearance between the piston and the cylinder is insured to keep them away from each other. Further, when the piston inside the cylinder is moved to the expanding direction, the moveable element is reversely shifted toward the outside of the piston so that the small communication hole is closed, whereby the gas is prevented from flowing out into the cylinder, through the hollow interior of the piston and the clearance between the piston and the cylinder.

According to a second aspect of the invention, there is provided a fluid bearing mechanism according to the first aspect, wherein the retaining body is made of an elastic material so that the abutting portion, moveable element and retaining body are allowed to abut to each other at least when the piston is in a stationary state. Thus, when the piston is in a stationary state, the moveable element abuts to the abutting portion to close the small communication hole, while if the piston is shifted toward the compressing direction, the retaining body is elastically deformed due to the force applied to the moveable element, so that the moveable element is moved toward the inside of the piston to thereby open the small communication hole.

According to a third aspect of the invention, there is provided a fluid bearing mechanism according to one of the foregoing aspects, wherein at least the surface of either the moveable element or the abutting portion is made of an elastic material. Thus, when the abutting portion abuts to the moveable element, either the moveable element or the abutting portion is elastically deformed so that not only are they contacted by each other more closely but also the impact developed when they comes into collision with each other is absorbed.

According to a fourth aspect of the invention, there is provided a fluid bearing mechanism according to the first or the second aspect, wherein an abutting surface of said abutting portion is formed concavely conical while an abutting surface of said moveable element opposing to said abutting portion is formed convexly conical with an apex angle of the former being substantially equal to that of the latter. Thus, when they abut to each other, they are contacted by each other over an entire surface thereof, thereby preventing the leakage of gas from the small communication hole.

According to a further aspect of the invention, there is provided a fluid bearing mechanism, which comprises: a cylinder; a piston positioned inside the cylinder, having a side surface, end faces and a hollow interior formed therein side, said piston including small holes defined through the side surface for communicating the hollow interior with an exterior thereof; a one-way valve provided between the end face and the hollow interior of said piston, said one-way valve allowing a gas to flow in one direction only, wherein said one-way valve comprises: a cylindrical body provided in parallel with an axial direction of said piston; an abutting portion provided along an inner periphery of said cylindrical body, said abutting portion protruding inwardly, formed with a small communication hole in a substantial center thereof; and a plug body made of an elastic material, said plug body having a proximal end fixed to an aperture of said cylindrical body, including a ventilation groove for communicating an inside with an outside of said cylindrical body, and a distal end which is able to plug said small communication hole by abutting to said abutting portion.

Accordingly, when the piston is moved to the compressing direction inside the cylinder, the plug body is elastically deformed due to the inner pressure of the cylinder and its inertia, so that the small communication hole is opened, thus allowing the gas inside the cylinder to flow from the small communication hole of the one-way valve, through the ventilation groove into the hollow interior of the piston, and then to flow through the small holes into the clearance between the piston and the cylinder. As a result, the clearance between the piston and the cylinder is maintained to keep them away from each other. On the other hand, when the piston inside the cylinder is moved to the expanding direction, the plug body is restored to its original shape so that the small communication hole is closed, whereby the gas is prevented from flowing out into the cylinder, through the hollow interior of the piston and the clearance between the piston and the cylinder.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which.

DESCRIPTION OF PREFERRED EMBODIMENTS

Figure 1:
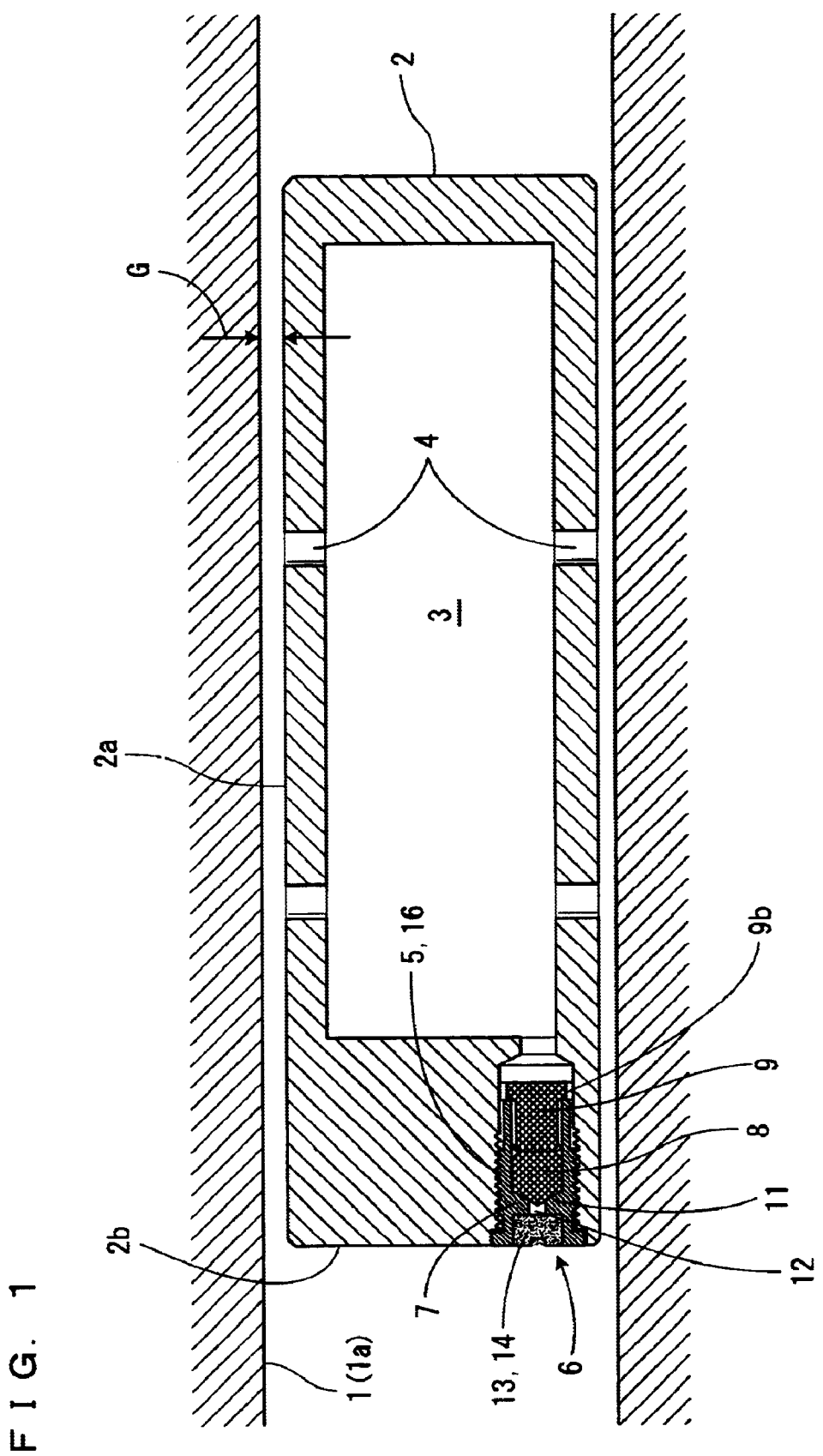
FIG. 1 is a section of a fluid bearing mechanism according to a first embodiment of the invention.
Figure 2:
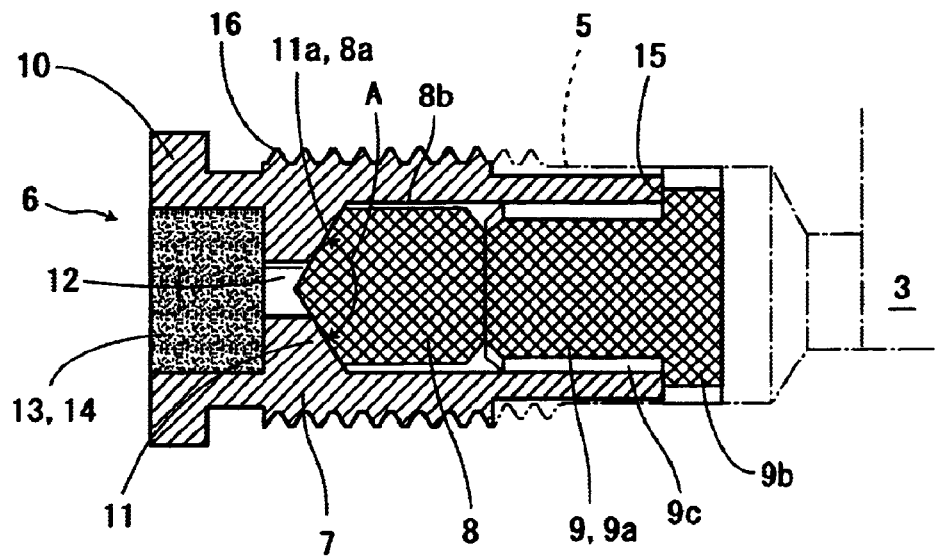
FIG. 2 is a section of a principal part of the fluid bearing mechanism according to the first embodiment of the invention.

Hereinafter is described a first embodiment of the present invention with reference to FIGS. 1 and 2, Reference numeral 1 designates a cylinder, having an inner wall 1a, while a piston 2 is reciprocably inserted into a space defined by the inner wall 1a, with a slight clearance G interposed therebetween. The piston 2 is formed with a hollow interior 3 therein side, having a side face 2a and a plurality of small holes 4 extending through the side face 2a into the hollow interior 3. An attachment hole 5 is formed between a distal end face 2b of the piston 2 and the hollow interior 3, having a one-way valve 6 attached thereto.

The one-way valve 6 comprises a valve base 7, a moveable element 8 and a retainer body 9. The valve base 7 is formed approximately cylindrical, having an axial line which is parallel to the axial direction of the piston 2, and is formed with a flange 10 around its outer periphery on a distal end side.The inner periphery of the valve base 7 is formed with a rib-shaped abutting portion 11 near its distal side, said abutting portion 11 including a small communication hole 12 which is formed in the center thereof and an abutting portion 11a which is formed concavely conical on a proximal side thereof. At least a surface of the abutting portion 11a is covered with an elastic material such as rubber. Inside the valve base 7, the aforesaid moveable element 8 is inserted thereinto from its proximal end. The moveable element 8 is able to move in the axial direction inside the valve base 7, and is formed of an elastic material such as rubber, which is formed into a substantially short-cylinder shape as a whole, while the abutting surface 8a at its distal side is formed convexly conical. The abutting surface 8a has an apex angle A substantially equal to that of the aforesaid abutting portion 11a. The side surface of the moveable element 8 is formed with a ventilation groove 8b in the axial direction.

Further, a retaining body 9 is pressed into from the proximal end of the valve base 7. The retaining body 9 is formed of an elastic material such as rubber, like that of the said moveable element 8. The retaining body 9 comprises a substantially cylindrical press-fit portion 9a and a flange portion 9b provided at the proximal end of the press-fit portion 9a such that the aforesaid abutting portion 11, the moveable element 8 and the retaining body 9 abut to each other when the piston 2 is in a stationary state. The outer peripheral surface of the retaining body 9 is formed with a ventilation groove 9c in the axial direction, said ventilation groove 9c providing the communication between the inside and the outside of the valve base 7.

A concave portion 13 is formed between the distal end of the valve base 7 and the tip end of the abutting portion 11, while a breathable filter 14 made of porous resin, unwoven cloth or the like is attached to the concave portion 13. In the meantime, the aforesaid flange portion 9b abuts to a proximal aperture 15 of the valve base 7, while the valve base 7 is secured to the attachment hole 5 by a male screw 16 formed on the outer periphery of the valve base 7.

Next, the action of the above-structured mechanism is described.

When the piston 2 is in a stationary state, the abutting surface 8a of the moveable element 8 contacts the abutting portion 11 of the valve base 7 so that the small communication hole 12 is closed. When the piston 2 is moved to the compressing direction in the cylinder 1, i.e., to the left direction in the drawings, the moveable element 8 is urged toward the inside of the piston 2, i.e., to the right direction in the drawings, due to the inner pressure of the cylinder 1 and its inertia, so that the moveable element 8 is shifted toward the proximal end of the valve base 7, while the retaining body 9 is elastically deformed to thereby open the small communication hole 12, thus allowing the gas inside the cylinder 1 to flow through the small communication hole 12, ventilation grooves 8b and 9c into the hollow interior 3, and then to flow through the small holes 4 into the clearance G between the piston 2 and the cylinder 1. As a result, the clearance G between the piston 2 and the cylinder 1 is insured to keep them away from each other by the clearance G, thus achieving antifriction between the cylinder 1 and the piston 2. At this moment, it should be noted that the moveable element 8 has such a comparatively large mass that the force of inertia works effectively so as to facilitate the opening and closing action of the moveable element 8 during the reciprocating movement of the piston 2.

Further, when the piston 2 inside the cylinder 1 is moved to the expanding direction, i.e., reversely moved to the right direction in the drawings, the moveable element 8 is shifted toward the outside of the piston 2, i.e., to the left in the drawings to thereby abut to the abutting portion 11, due to its inertia and the restoring force of the retaining body 9, so that the small communication hole 12 is closed while the elastically deformed retaining body 9 is restored to its original shape, thus pressing the moveable element 8 against the abutting portion 11, whereby the gas is prevented from flowing out into the cylinder 1, through the hollow interior 3 of the piston 2 and the clearance G between the piston 2 and the cylinder 1.

According to the foregoing embodiment of the invention, there is provided a fluid bearing mechanism which comprises: the cylinder 1; the piston 2 provided inside the cylinder 1, said piston 2 including the hollow interior 3 and the side surface 2a with small holes defined therethrough; and the one-way valve 6 provided between the distal end face 2b and the hollow interior 3 of the piston 2 for allowing gas to flow in one direction only, wherein said one-way valve 6 comprises: the valve base 7 provided in parallel with the axial direction of the piston 2, the abutting portion 11 provided along the inner periphery of the valve base 7, said abutting portion 11 protruding inwardly with the small communication hole 12 formed in the center thereof; the moveable element 8 which is moveable in the axial direction within the valve base 7; and the retaining body 9 for retaining the moveable element 8 between the abutting portion 11 and itself, said retaining body 9 including the ventilation groove 9c for communicating the inside with the outside of the valve base 7.

With the structure thus made, when the piston 2 is moved to the compressing direction inside the cylinder 1, the moveable element 8 is urged toward the inside of the piston 2, due to the inner pressure of the cylinder 1 and its inertia, so that the small communication hole 12 is opened, thus allowing the gas inside the cylinder 1 to flow through the small communication hole 12 of the one-way valve 6, ventilation grooves 8b and 9c into the hollow interior 3 of the piston 2, and then to flow through the small holes 4 into the clearance G between the piston 2 and the cylinder 1. As a result, the clearance G between the piston 2 and the cylinder 1 is insured to keep them away from each other.

Further, when the piston 2 inside the cylinder 1 is moved to the expanding direction, the moveable element 8 is reversely shifted toward the outside of the piston 2 so that the small communication hole 12 is closed, whereby the gas is prevented from flowing out into the cylinder 1, through the hollow interior 3 of the piston 2 and the clearance G between the piston 2 and the cylinder 1. Thus, there can be provided a fluid bearing mechanism with such a simple structure to be easily assembled, ensuring the opening and closing action of the one-way valve 6 at low production cost but with the high reliability, Furthermore, as the moveable element 8 controls inflow or stoppage of a gas not only by the gas pressure but also by comparatively large inertia in the moveable element 8, highly reliable action is insured.

Moreover, as the retaining body 9 is made of elastic material, and is so structured that the aforesaid abutting portion 11, the moveable element 8 and the retaining body 9 contact each other when the piston 2 is in a stationary state. Specifically, when the piston 2 is in a stationary state, the moveable element 8 is in contact with the abutting portion 11 so as to close the small communication hole 12. When the piston 2 is moved toward the compressing direction, the retaining body 9 is elastically deformed due to a force applied to the moveable element 8, so that the moveable element 8 is shifted inwardly of the piston 2, thereby opening the small communication hole 12. Accordingly, even though the piston 2 is moved toward the compressing direction, the impact developed in association with the shift of the moveable element 8 is absorbed by the retaining body 9. Thus, not only the noise can be prevented, but also the moveable element 8 can be brought in contact with the abutting portion 11 by the elastic force of the retaining body 9 when the piston 2 is in a stationary state or moving toward the expanding direction, thereby ensuring the operation of the fluid bearing.

Additionally, as the moveable element 8 is made of an elastic material such as rubber with its surface being made of the elastic material as well, the moveable element 8 is elastically deformed when the abutting portion 11 and the moveable element 8 abut to each other, so that they are allowed to contact each other so closely that the leakage of gas from the small communication hole 12 can be prevented, thus not only ensuring the operation of the fluid bearing but also preventing the noise by absorbing the impact developed when the moveable element 8 comes into collision with the abutting portion 11.

Still also, as at least the surface of the abutting portion 11 is covered with an elastic material such as rubber, the abutting portion 11 is elastically deformed when the abutting portion 11 and the moveable element 8 abut to each other, so that they are allowed to contact each other more closely, whereby the leakage of gas from the small communication hole 12 can be prevented, thus not only further ensuring the operation of the fluid bearing but also preventing the noise by absorbing the impact developed when the moveable element 8 comes into collision with the abutting portion 11.

In addition to the foregoing, as the abutting portion 11a of the abutting portion 11 is formed concavely conical while the abutting surface 8a of the moveable element 8 is formed convexly conical with the apex angle A of the former being substantially equal to that of the latter, the whole surface 11a is allowed to contact the whole surface 8a when the abutting portion 11 abuts to the moveable element 8, thus preventing the leakage of gas from the small communication hole 12, ensuring the reliable operation of the fluid bearing.

Next, other embodiments of the invention will be described with reference to FIGS. 3 through 5, in which the same portions as those described in the foregoing embodiment are designated by the same reference numerals, and their repeated detailed descriptions will be omitted.

Figure 3:
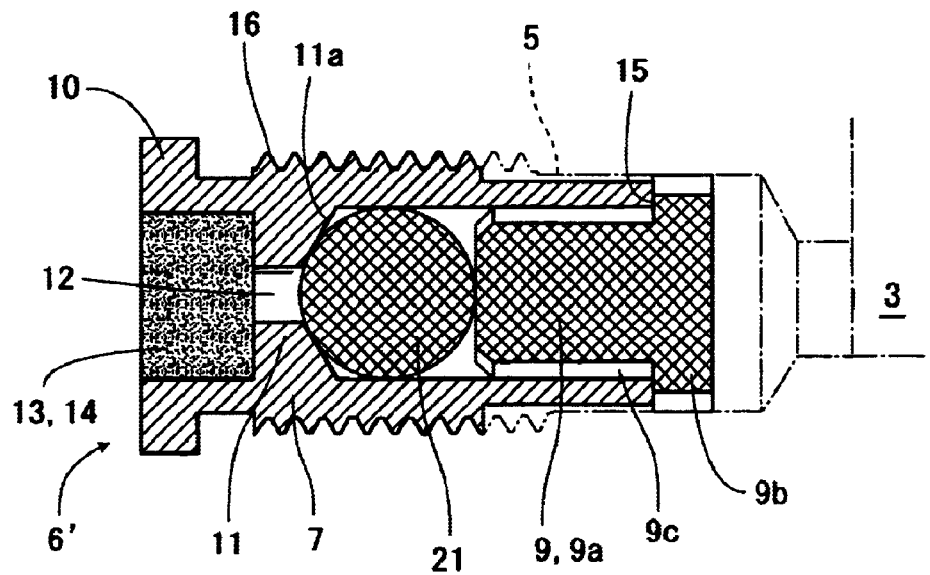
FIG. 3 is a section of a fluid bearing mechanism according to a second embodiment of the invention.

In FIG. 3 showing a second embodiment, a moveable element 21 of a one-way valve 6' is formed spherical, made of fluoro-rubber serving as an elastic material. The spherical moveable element 21 is retained between the abutting portion 11 and the retaining body 9 in the valve base 7.

Accordingly, when the piston 2 inside the cylinder is moved toward the compressing direction, i.e., to the left direction in the drawing, the moveable element 21 is urged toward the inside of the piston 2, i.e., to the right direction in the drawing, due to the inner pressure of the cylinder 1 and its inertia, so that the moveable element 21 is shifted toward the proximal end of the valve base 7, while the retaining body 9 is elastically deformed to thereby open the small communication hole 12, thus allowing the gas inside the cylinder 1 to flow from the small communication hole 12 of the one-way valve 6' through the ventilation groove 9c into the hollow interior 3, and then to flow through the small holes 4 into the clearance G between the piston and the cylinder. As a result, the clearance between the piston and the cylinder is insured to keep them away from each other, thus achieving antifriction therebetween. Thus, there can be provided a fluid bearing mechanism with such a simple structure to be easily assembled, ensuring the opening and closing action of the one-way valve 6' at low production cost but with high reliability.

Figure 4:
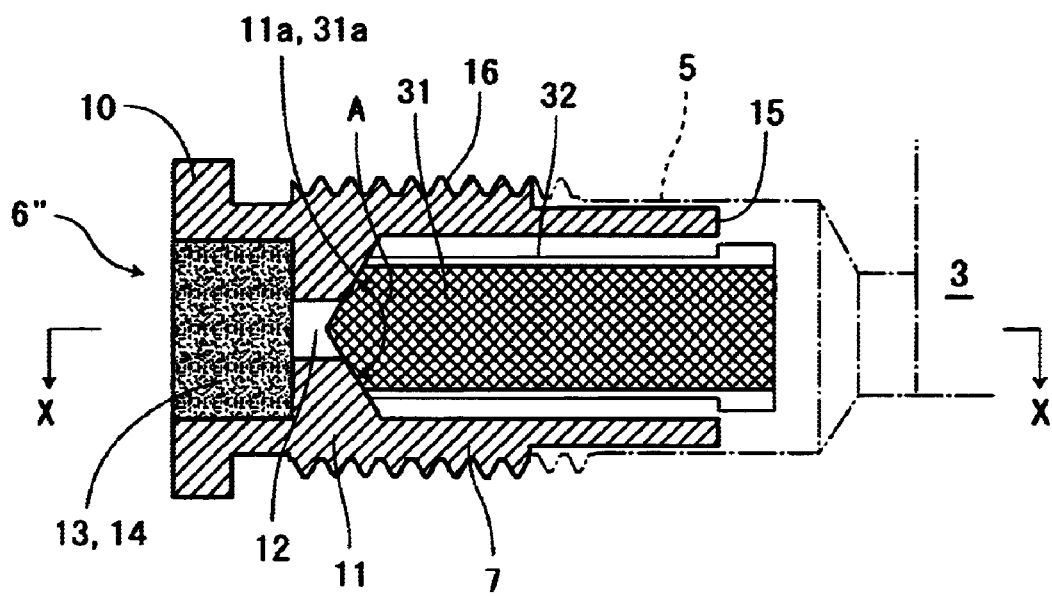
FIG. 4 is a section of a fluid bearing mechanism according to a third embodiment of the invention.
Figure 5:
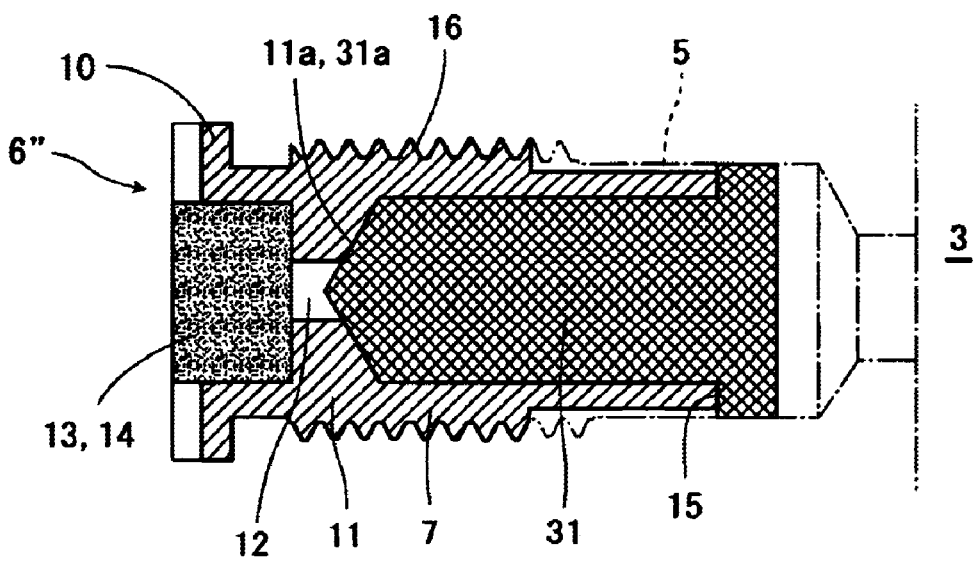
FIG. 5 is a cross-sectional view taken along X—X line of FIG. 4.
Figure 6:
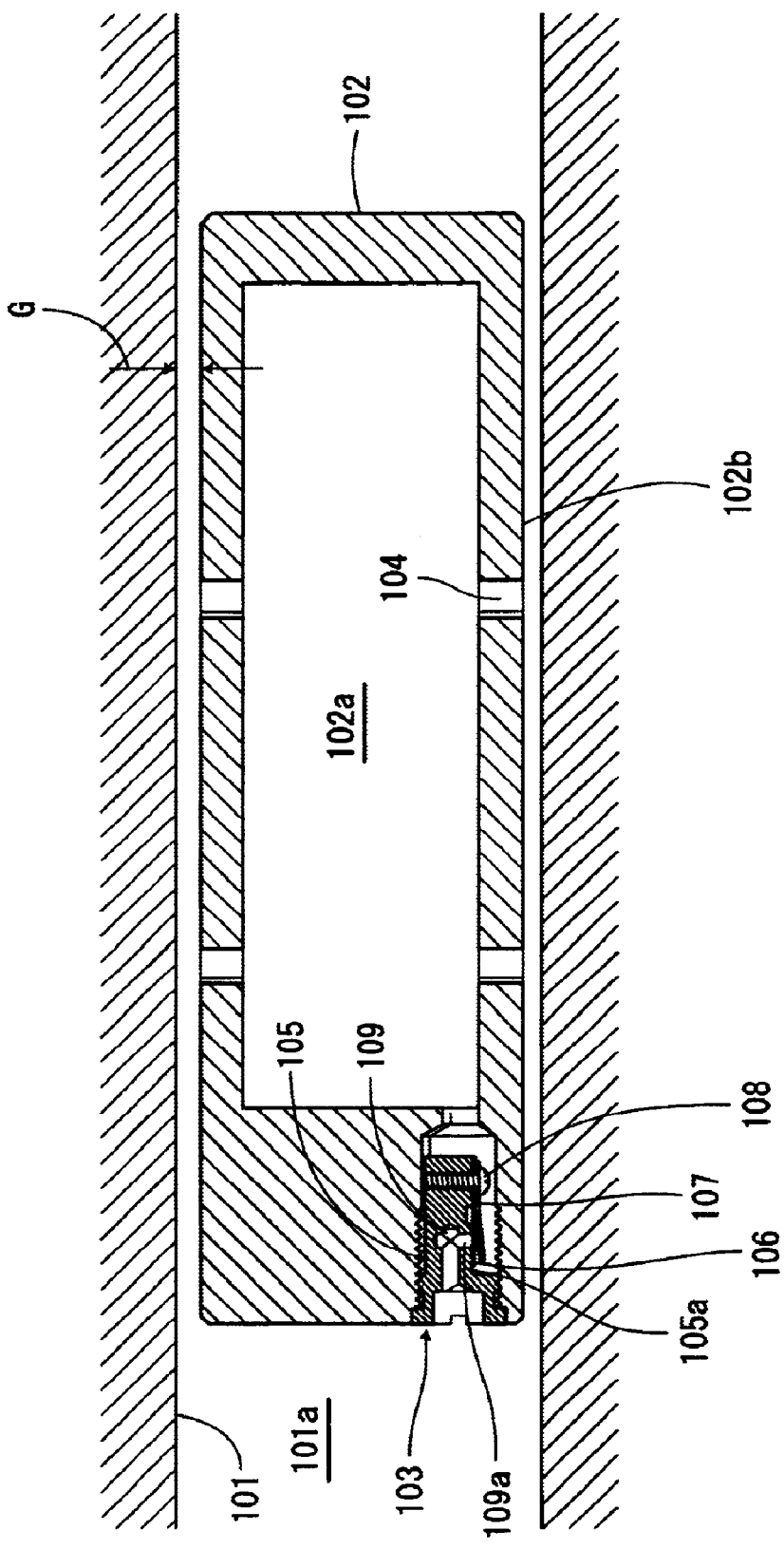
FIG. 6 is a section illustrating a conventional fluid bearing mechanism.
Figure 7:
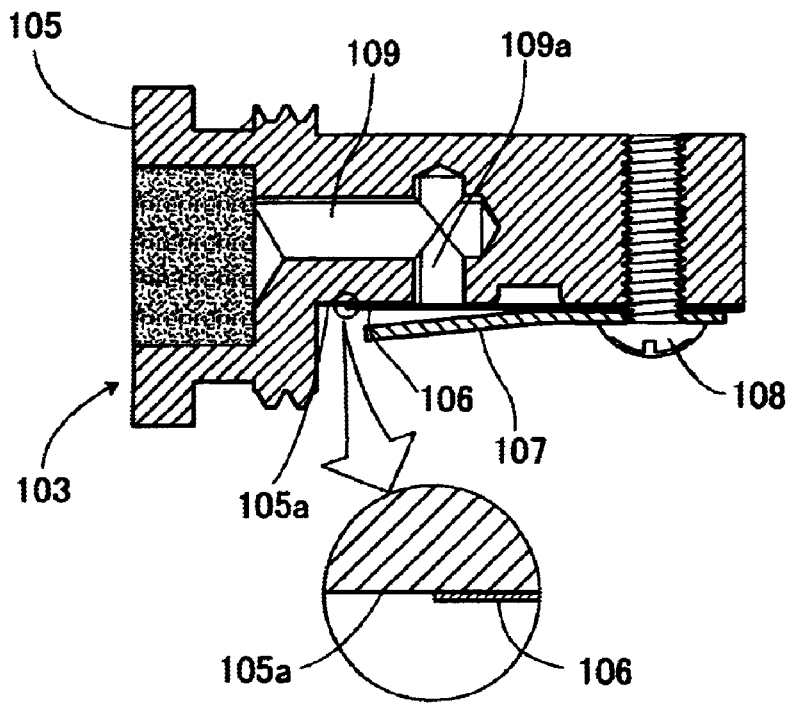
FIG. 7 is a section of a principal part of the conventional fluid bearing mechanism.
Figure 8:
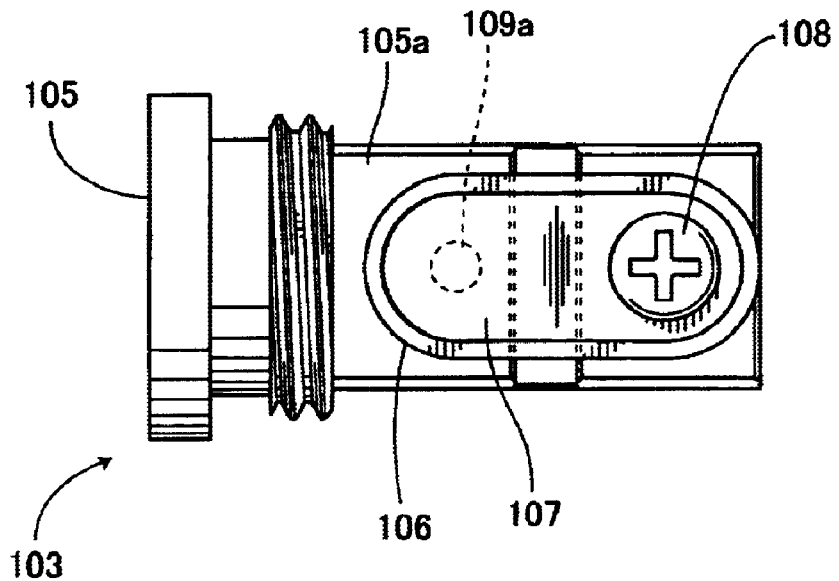
FIG. 8 is a front view of the principal part of the conventional fluid bearing mechanism.

Referring to FIGS. 4 and 5 showing a third embodiment of the invention, a one-way valve 6" of the embodiment comprises a substantially cylindrical valve base 7 and a plug body 31. The valve base 7 includes the abutting portion 11 protruding inwardly, formed with the small communication hole 12 in the center thereof. The plug body 31 made of an elastic material abuts to the proximal aperture 15 of the valve base 7 so as to be fixed thereto, including a ventilation groove 32 which provides the communication between the inside and the outside of the valve base 7. The distal end of the plug body 31 is able to plug the small communication hole 12 by abutting to the abutting portion 11. An abutting surface 31a at the distal end of the plug body 31 is formed convexly conical with the apex angle A thereof being substantially equal to that of the abutting portion 11a. In the meantime, the aforesaid ventilation groove 32 is formed on the outer peripheral surface of the plug body 31 in the axial direction from the distal to the proximal side thereof.

Accordingly, when the piston 2 is moved to the compressing direction inside the cylinder 1, the plug body 31 is elastically deformed due to the inner pressure of the cylinder 1 and its inertia, so that the small communication hole 12 is opened, thus allowing the gas inside the cylinder 1 to flow from the small communication hole 12 of the one-way valve 6", through the ventilation groove 32 into the hollow interior 3 of the piston 2, and then to flow through the small holes 4 into the clearance G between the piston 2 and the cylinder 1. As a result, the clearance G between the piston 2 and the cylinder 1 is maintained to keep them away from each other. On the other hand, when the piston 2 is moved to the expanding direction inside the cylinder 1, the plug body 31 is restored to its original shape so that the small communication hole 12 is closed, whereby the gas is prevented from flowing out into the cylinder 1, through the hollow interior 3 of the piston 2 and the clearance G between the piston 2 and the cylinder 1.

According to the foregoing embodiment, the one-way valve 6" comprises the valve base 7 and the plug body 31, said plug body 31 being elastically deformed due to the inner pressure of the cylinder 1 and the inertia thereof so that the small communication hole 12 is opened. Through the above-mentioned actions including such hole-opening action, there can be provided a fluid bearing mechanism with such a simple structure to be easily assembled, ensuring the opening and closing action of the one-way valve 6" at low production cost but with the high reliability, Incidentally, the present invention should not be limited to the foregoing embodiments, but may be modified within a scope of the invention. For example, at least one of the abutting portion and the moveable element may be made of an elastic material when they contact each other in the first and second embodiments. Likewise, at least one of the abutting portion and the distal abutting surface of the plug body may be made of an elastic material when they contact each other in the third embodiment. Further, the aforesaid small communication hole does not have to be formed precisely in the center of the abutting portion, but may be formed in the substantial center thereof.

What is claimed:

1. A fluid bearing mechanism which comprises:

a cylinder;

a piston positioned inside the cylinder, having a side surface, end faces and a hollow interior formed thereinside, said piston including small holes defined through the side surface for communicating the hollow interior with an exterior thereof;

a one-way valve provided between an end face and the hollow interior of said piston, said one-way valve allowing a gas to flow in one direction only, wherein said one-way valve comprises:

a cylindrical body provided in parallel with an axial direction of said piston;

an abutting portion provided along an inner periphery of said cylindrical body, said abutting portion protruding inwardly, formed with a small communication hole in a substantial center thereof;

a moveable element which is moveable inside said cylindrical body in an axial direction thereof; and a retaining body for retaining said moveable element between said abutting portion and itself inside said cylindrical body, said retaining body including a ventilation groove for communicating an inside with an outside of said cylindrical body.

2. A fluid bearing mechanism according to claim 1, wherein said retaining body is made of an elastic material so that said abutting portion, moveable element and retaining body are allowed to abut to each other at least when said piston is in a stationary state.

3. A fluid bearing mechanism according to claim 1, wherein at least a surface of said moveable element is made of an elastic material.

4. A fluid bearing mechanism according to claim 1, wherein at least a surface of said abutting portion is made of an elastic material.

5. A fluid bearing mechanism according to claim 1, wherein an abutting surface of said abutting portion is formed concavely conical while an abutting surface of said moveable element opposing to said abutting portion is formed convexly conical with an apex angle of the former being substantially equal to that of the latter.

6. A fluid bearing mechanism according to claim 2, wherein at least a surface of said moveable element is made of an elastic material.

7. A fluid bearing mechanism according to claim 2, wherein at least a surface of said abutting portion is made of an elastic material.

8. A fluid bearing mechanism according to claim 2, wherein an abutting surface of said abutting portion is formed concavely conical while an abutting surface of said moveable element opposing to said abutting portion is formed convexly conical with an apex angle of the former being substantially equal to that of the latter.

9. A fluid bearing mechanism which comprises:

a cylinder;

a piston positioned inside the cylinder, having a side surface, end faces and a hollow interior formed thereinside, said piston including small holes defined through the side surface for communicating the hollow interior with an exterior thereof;

a one-way valve provided between the an end face and the hollow interior of said piston, said one-way valve allowing a gas to flow in one direction only, wherein said one-way valve comprises:

a cylindrical body provided in parallel with an axial direction of said piston;

an abutting portion provided along an inner periphery of said cylindrical body, said abutting portion protruding inwardly, formed with a small communication hole on a substantial center thereof; and a plug body made of an elastic material, said plug body having a proximal end fixed to an aperture of said cylindrical body, including a ventilation groove for communicating an inside with an outside of said cylindrical body, and a distal end which is able to plug said small communication hole by abutting to said abutting portion.

* * * * *